April 28, 1942.  R. S. ELBERTY, JR  2,281,518
ADJUSTABLE SPEED DRIVE
Filed Nov. 3, 1938
Fig 1
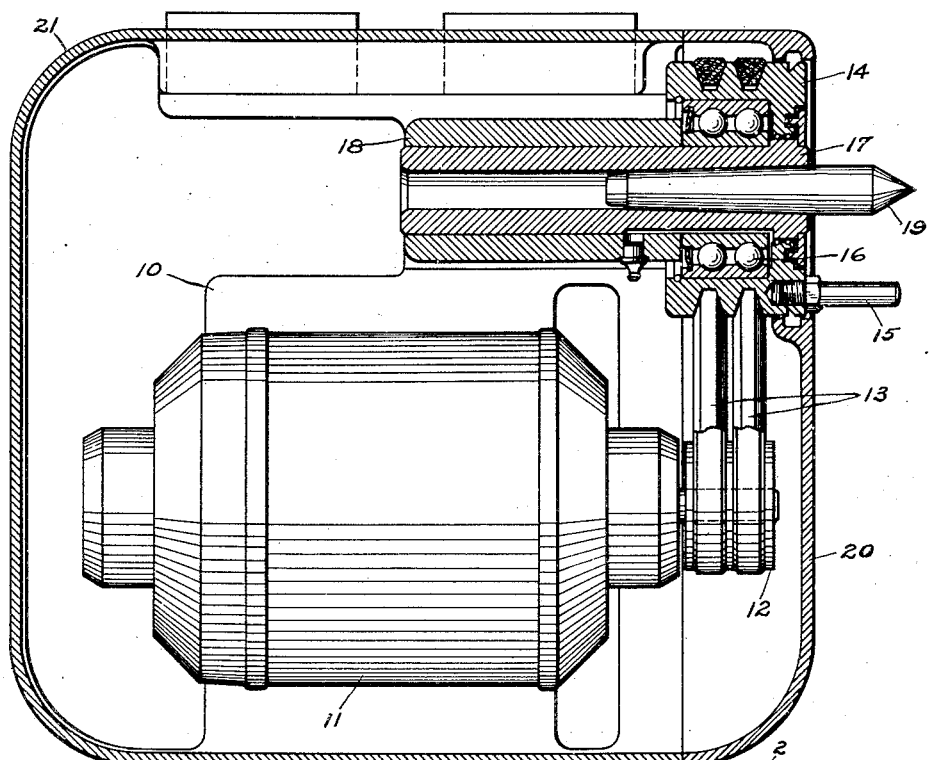
Fig 2
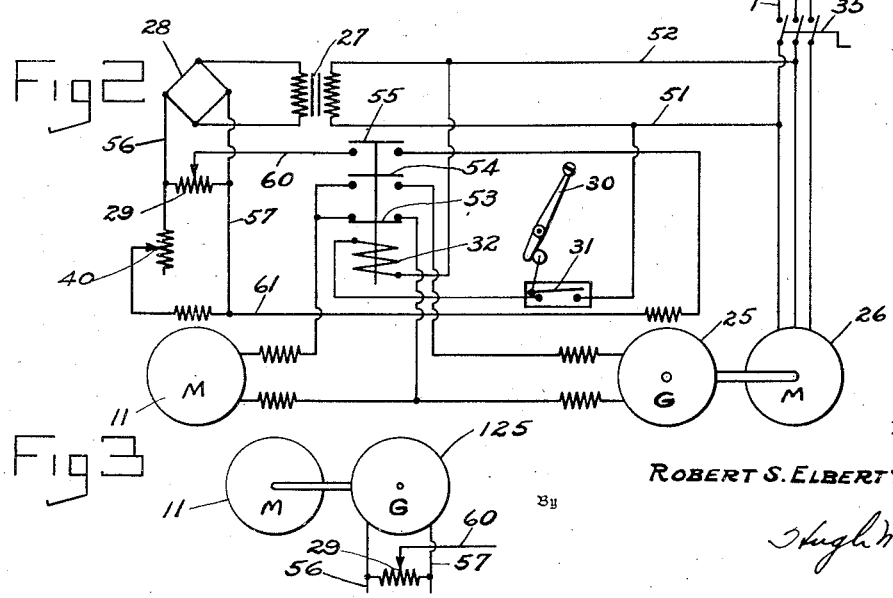
Fig 3
Inventor
ROBERT S. ELBERTY JR.
By
Hugh N Roche
Attorney

UNITED STATES PATENT OFFICE 2,281,518

ADJUSTABLE SPEED DRIVE

Robert S. Elberty, Jr., Waynesboro, Pa., assignor to Landis Tool Company, Waynesboro, Pa.

Application November 3, 1938, Serial No. 238,657

3 Claims. (Cl. 172—239)

My invention relates to adjustable speed driving mechanisms particularly for use on machine tools.

An object of my invention is to provide an adjustable speed driving mechanism particularly for driving a headstock spindle.

A further object is to provide a direct belt drive from the motor to the headstock spindle.

A further object is to provide a speed range greater than that obtainable with conventional shunt field control.

A further object is to provide means for maintaining constant speed of said motor throughout its entire speed range regardless of variation in load.

A further object is to provide an inexpensive speed control means which will give a large number of speeds within a given range.

A further object is to provide a novel brake for said driving motor.

Adjustable speed motors having a range greater than six to one have been made in the past but these have usually been high speed motors, the speed range varying from 700 to 5,000 revolutions. This high speed was necessary in order that sufficient power would be available at the lower speeds of the driven member without having a motor that would be too large in physical dimensions.

In order to apply motors of this type to a headstock drive considerable speed reduction was necessary. If a belt type of reduction was used, a jack shaft was necessary and too much space was required. If a gear reduction was used, the parts were expensive and the assembly while it did not require as much space as a belt drive, neither was it as smooth in operation. Both types of drives were inefficient because of the power required to overcome friction.

My invention provides a drive having a speed range of nine or ten to one and requires neither jack shafts nor stepped pulleys. The motor drives the spindle direct thru a single belt drive reduction. The source of armature current for said motor is a generator driven at a constant speed by one of the other motors on the machine. The generator has a separately excited field, and the voltage of the exciting current is adjusted so that the voltage output of the generator, and therefore the speed of the motor, may be adjusted. This generator makes use of a characteristic which is generally undesirable and that is an increase in output voltage as the load on the motor increases. This is accomplished by overcompounding the generator and the generator voltage characteristic is matched to the motor speed characteristic to give the effect of maintaining a uniform motor speed regardless of changes in load.

For varying the generator field a potentiometer is used rather than a conventional series rheostat. The reason for this is that a potentiometer gives 100% voltage range, i. e. from full voltage to no voltage. With the conventional series rheostat the voltage range depends on the relation between the resistance in the rheostat and that of the series field, for example a rheostat of nine times the generator field has a volatge range of 100% to 10%. With a rheostat of ninety-nine times generator field the voltage range is 100% to 1%. Such high resistance rheostats are expensive and the potentiometer gives a lower minimum speed providing the current requirements are low as they are in this application.

A very simple and effective dynamic brake is provided by short circuiting the motor armature thru the motor series field, thus reversing the current thru the series field. This causes the series field to subtract from the shunt field with the result that the dynamic braking current is limited to a safe value. This, of course, would require that the series field should not be strong enough to completely cancel the shunt field but should be strong enough so that when the motor is short circuited for braking the short circuit current is limited to a safe value from the point of view of commutation, heating and mechanical stress. A machine so wound, when operated as a motor, would be one having a rapidly falling speed characteristic as the load is increased if operated from a constant potential source.

Figure 1 is a sectional plan view showing the construction of the headstock.

Figure 2 is a wiring diagram.

Figure 3 is a partial diagram showing an optional source of exciting current.

In the drawing numeral 10 indicates a base plate, 11 a motor mounted in said base plate having a pulley 12 connected thru belts 13 to a face plate pulley 14. A pin 15 threaded into the face of said pulley serves in the usual manner for rotating a work piece. Said pulley 14 is rotatably supported on a double row ball bearing 16 which in turn is mounted on a sleeve 17. Said sleeve is mounted in a cylindrical member 18 integral with said base plate. The inside surface of sleeve 17 is tapered at one end to receive a work center 19. A fixed cover member 20 secured to said base plate covers a portion of the right hand end of said headstock assembly. Another cover 21 hinged to said base plate covers the rest of said headstock and fits flush with said cover 20.

The electrical equipment and connections are shown diagrammatically in Figure 2 and include a motor 11, a generator 25 for supplying current to said motor, and a motor 26 for driving said generator.

The field of said generator, as well as that of motor 11, is separately excited in this case by current from the line to motor 26. Said current is stepped down by a transformer 27 and passed thru a rectifier 28. As shown in Figure 3 a second generator 125 driven by motor 26 might be used instead of the rectifier. The voltage from said rectifier for generator field control is adjusted by a potentiometer 29. The result of such control of the generator field is to vary the power output of the generator and hence the speed of motor 11. In order to obtain a constant motor speed regardless of variation in load, the generator is over-compounded so that instead of a decrease in voltage output with increased load, the voltage increases with the load and this characteristic of the generator voltage output is accurately adjusted to neutralize the tendency of the motor to slow down under load. The start and stop lever 30 operates a switch 31 in a circuit which branches off from that supplying the primary coil of transformer 27, and which serves to energize the coil of relay 32. A rheostat 40 in the motor field circuit provides additional speed adjustment for said motor.

The normally closed contact 53 of relay 32 completes a short circuit between the armature leads thru the series field to form an effective and inexpensive dynamic brake.

Operation

Motor 26 may be started by closing switch 35 thus starting generator 25. Lines 51 and 52 lead from motor supply lines 1 and 2 respectively to transformer 27 and rectifier 28. From said rectifier is a direct connection, lines 56 and 57, to the field of motor 11 and a second connection from said lines thru potentiometer 29, lines 60 and 61, and relay 32 to the field of generator 25. Shifting lever 30 to the left closes switch 31 to complete a circuit from lines 51 and 52 thru relay 32 thus energizing said relay, opening the normally closed circuit thru contacts 53 and closing the normally open circuits thru contacts 54 and 55. Closing the circuit thru contact 54 connects generator 25 with motor 11. At the same time, thru contact 55 voltage is supplied to the generator shunt field. This provides easy starting for motor 11 as the generator voltage does not build up immediately. The circuit thru contact 55 includes a potentiometer 29 by which the voltage on the generator field may be adjusted. This will cause a variation in the voltage output of the generator and a resultant speed variation in the motor. The speed range may be further increased by using a potentiometer in the field circuit. This permits a voltage range from line voltage to no voltage on the generator field with a consequent effect on the output voltage of the generator and hence on the motor speed.

When switch 31 is opened to stop motor 11, relay 32 is deenergized, the normally open contacts 54 and 55 are opened and the normally closed contact 53 is closed. Opening contact 54 and closing contact 53 results in short circuiting the armature of the motor through the motor series field. This reverses the current thru the series field which now subtracts from the shunt field and limits the voltage and braking current to a point where there will be no ill effect on the motor as determined by the relative amount of turns in the series field winding as compared with the shunt field.

I claim:

1. In a speed control mechanism for an electrically driven part, a driving unit comprising a cumulatively compound wound motor connected to said part for operating same, as overcompounded generator for furnishing electrical energy to said motor for operating same, the field winding of the generator being proportioned so that an increase in load on the motor will cause a sufficient rise in output of the generator to maintain said motor speed substantially constant under said increased load.

2. In a speed control mechanism for an electrically driven part, a driving unit comprising a cumulatively compound wound motor for driving said part, an overcompounded generator connected to supply energy to said motor, means for adjusting the excitation of the generator whereby to adjust the voltage output thereof and thus adjust the motor speed, the degree of overcompounding of said generator being determined by that necessary to maintain a substantially constant motor speed under a varying load, whereby any selected motor speed may be maintained substantially constant under varying load.

3. In a speed control mechanism for an electrically driven part, a driving unit comprising a motor having a constantly excited field winding and a cumulatively wound series field winding so proportioned relative to said constantly excited field winding that the armature may be short circuited through the series field for braking without damaging said motor, such a winding causing said motor to have a drooping speed characteristic, an overcompounded generator for furnishing electrical energy to said motor for operating same, means for adjusting the excitation of the generator whereby to adjust the voltage output thereof and thus adjust the motor speed, the field winding of said generator being proportioned so that an increase in load on the motor will cause sufficient rise in output of the generator to counteract the dropping characteristic of said motor and thus maintain any selected motor speed substantially constant under increased load.

ROBERT S. ELBERTY, Jr.